US009860922B2

(12) United States Patent
Guo et al.

(10) Patent No.: US 9,860,922 B2
(45) Date of Patent: Jan. 2, 2018

(54) TRUNKING USER BASED MESSAGE TRANSMISSION METHOD AND DEVICE (71) Applicant: DATANG MOBILE COMMUNICATIONS EQUIPMENT CO., LTD, Beijing (CN)

(72) Inventors: Junli Guo, Beijing (CN); Xiaobo Su, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 14/373,037

(22) PCT Filed: Nov. 23, 2012

(86) PCT No.: PCT/CN2012/085135
§ 371 (c)(1),
(2) Date: Nov. 20, 2014

(87) PCT Pub. No.: WO2013/107217
PCT Pub. Date: Jul. 25, 2013

(65) Prior Publication Data
US 2015/0230273 A1      Aug. 13, 2015

(30) Foreign Application Priority Data
Jan. 19, 2012   (CN) .......................... 2012 1 0017360

(51) Int. Cl.
*H04W 72/00*      (2009.01)
*H04W 76/00*      (2009.01)
(Continued)

(52) U.S. Cl.
CPC ..... *H04W 76/002* (2013.01); *H04W 72/0413* (2013.01); *H04W 76/064* (2013.01);
(Continued)

(58) Field of Classification Search
None
See application file for complete search history.

(56) References Cited

U.S. PATENT DOCUMENTS 7,444,538 B2    10/2008  Sciacca
7,949,377 B2 *   5/2011  Islam ................ H04W 52/0251
                                                   455/154.1
(Continued)

FOREIGN PATENT DOCUMENTS

CN         1852494 A     10/2006
CN         1866947 A     11/2006
(Continued)

*Primary Examiner* — Huy D Vu
*Assistant Examiner* — James P Duffy
(74) *Attorney, Agent, or Firm* — Gokalp Bayramoglu (57) ABSTRACT

A trunking user based message transmission method and device. The method comprises: receiving a request message from a user equipment (UE) by the wireless access device, and allocating a connection resource for the UE by the wireless access device, wherein the request message carries information indicating whether the UE is a trunking user; when the UE is a trunking user, and if the UE does not receive or send data within a preset period, triggering the UE to enter a CELL_PCH state by the wireless access device; and when the UE is not a trunking user, and if the UE does not receive or send data within a preset period, releasing the connection resource of the UE by the wireless access device.

4 Claims, 5 Drawing Sheets

(51) Int. Cl.
*H04W 72/04* (2009.01)
*H04W 76/06* (2009.01)
*H04W 76/02* (2009.01)
*H04W 76/04* (2009.01)

(52) U.S. Cl.
CPC ............ *H04W 72/04* (2013.01); *H04W 76/02* (2013.01); *H04W 76/046* (2013.01); *H04W 76/068* (2013.01)

(56) References Cited

U.S. PATENT DOCUMENTS

| | | | | |
|---|---|---|---|---|
| 2005/0043024 | A1* | 2/2005 | Shiga | H04W 84/08 455/428 |
| 2005/0070274 | A1* | 3/2005 | Pedlar | H04W 60/04 455/432.1 |
| 2006/0003784 | A1* | 1/2006 | Chion | H04W 4/10 455/518 |
| 2006/0052137 | A1* | 3/2006 | Randall | H04W 72/048 455/560 |
| 2006/0223564 | A1* | 10/2006 | Rosen | H04W 76/005 455/519 |
| 2015/0094064 | A1* | 4/2015 | Lei | H04W 76/023 455/436 |

FOREIGN PATENT DOCUMENTS

| | | |
|---|---|---|
| CN | 101959281 A | 1/2011 |
| CN | I02014376 A | 4/2011 |
| CN | 102118855 A | 7/2011 |
| CN | 102572722 A | 7/2012 |
| EP | 2061192 A1 | 5/2009 |
| EP | 2384081 A2 | 11/2011 |
| GB | 2398968 A | 9/2004 |
| WO | WO2011/060707 | 5/2011 |
| WO | WO2011098163 A1 | 8/2011 |
| WO | WO2011/112000 | 9/2011 |
| WO | WO2011/137128 | 11/2011 |

* cited by examiner

TRUNKING USER BASED MESSAGE TRANSMISSION METHOD AND DEVICE

This application claims priority from Chinese Patent Application No. 201210017360.3, titled "Trunking User Based Message Transmission Method and Device", and filed on Jan. 19, 2012, in Chinese Intellectual Property Office, the entire contents of which are incorporated herein by reference.

TECHNICAL FIELD

The present invention relates to a communication technology field, and in particular to a trunking user based message transmission method and device.

BACKGROUND ART

When initiating a registration and paging, a user equipment (UE) first establishes a Radio Resource Control (RRC) connection with a network side and then establishes a Radio Access Bear (RAB). Further, after the UE establishes the RRC connection, cell updating may occur, based on which, the UE needs to finish a cell updating process with the network side.

During carrying out the present application, the inventor has found that at least the following problems exist in the prior art:

During the RRC connection and the cell updating, the network side cannot learn whether the UE is a trunking user, then cannot perform related processing.

SUMMARY OF THE INVENTION

The embodiments of the present invention are to provide a trunking user based message transmission method and device, such that a wireless access device is able to learn whether the UE is a trunking user.

In order to achieve the above objects, an embodiment of the present application provides a trunking user based message transmission method, comprising:
receiving a request message from a user equipment by a wireless access device, and allocating a connection resource for the user equipment by the wireless access device, wherein the request message carries information indicating whether the user equipment is a trunking user; when the user equipment is a trunking user, and if the user equipment does not receive or send data within a preset period, triggering the user equipment to enter a CELL-PCH state by the wireless access device; and when the user equipment is not a trunking user, and if the user equipment does not receive or send data within a preset period, releasing the connection resource of the user equipment by the wireless access device.

An embodiment of the present application provides a trunking user based message transmission method, comprising:
determining whether a user equipment is a trunking user by the user equipment; and sending a request message to a wireless access device by the user equipment, wherein the request message carries information indicating whether the user equipment is a trunking user.

An embodiment of the present application provides a wireless access device, comprising:
a receiving module, configured to receive a request message from a user equipment, wherein the request message carries information indicating whether the user equipment is a trunking user; an allocating module, configured to allocate a connection resource for the user equipment; and a processing module, configured to, when the user equipment is a trunking user, and if the user equipment does not receive or send data within a preset period, trigger the user equipment to enter a CELL-PCH state; and when the user equipment is not a trunking user, and if the user equipment does not receive or send data within a preset period, release the connection resource of the user equipment.

An embodiment of the present application provides a user equipment, comprising:
a determining module, configured to determine whether the user equipment is a trunking user; and a sending module, configured to send a request message to a wireless access device, wherein the request message carries information indicating whether the user equipment is a trunking user.

Compared to the prior art, the embodiments of the present application have at least the following advantages: in the embodiments according to the present application, the wireless access device can identify the trunking identity of the user equipment (that is, learn whether the user equipment is a trunking user), so as to allocate wireless resources and schedule a user management policy according to the trunking identity of the user equipment.

BRIEF DESCRIPTION OF DRAWINGS

In order to more clearly explain the technical solutions of the present application, the accompanying drawings needed in the description of the embodiments will be simply introduced hereafter. Obviously, the accompanying drawings described below are merely some embodiments of the present invention and it should be noted by an ordinary person skilled in the art that other drawings may be obtained on the basis of the these drawings without paying creative efforts.

DETAILED DESCRIPTION OF EMBODIMENTS

Hereafter, technical solutions of the present application will be clearly and fully described in conjunction with the accompanying drawings. Obviously, the described embodiments are only part but not all of the embodiments of the present application. Based on the embodiments of the present application, all other embodiments obtained by an ordinary person skilled in the art without paying creative efforts will fall into the protection scope of the present application.

First Embodiment

Figure 1:
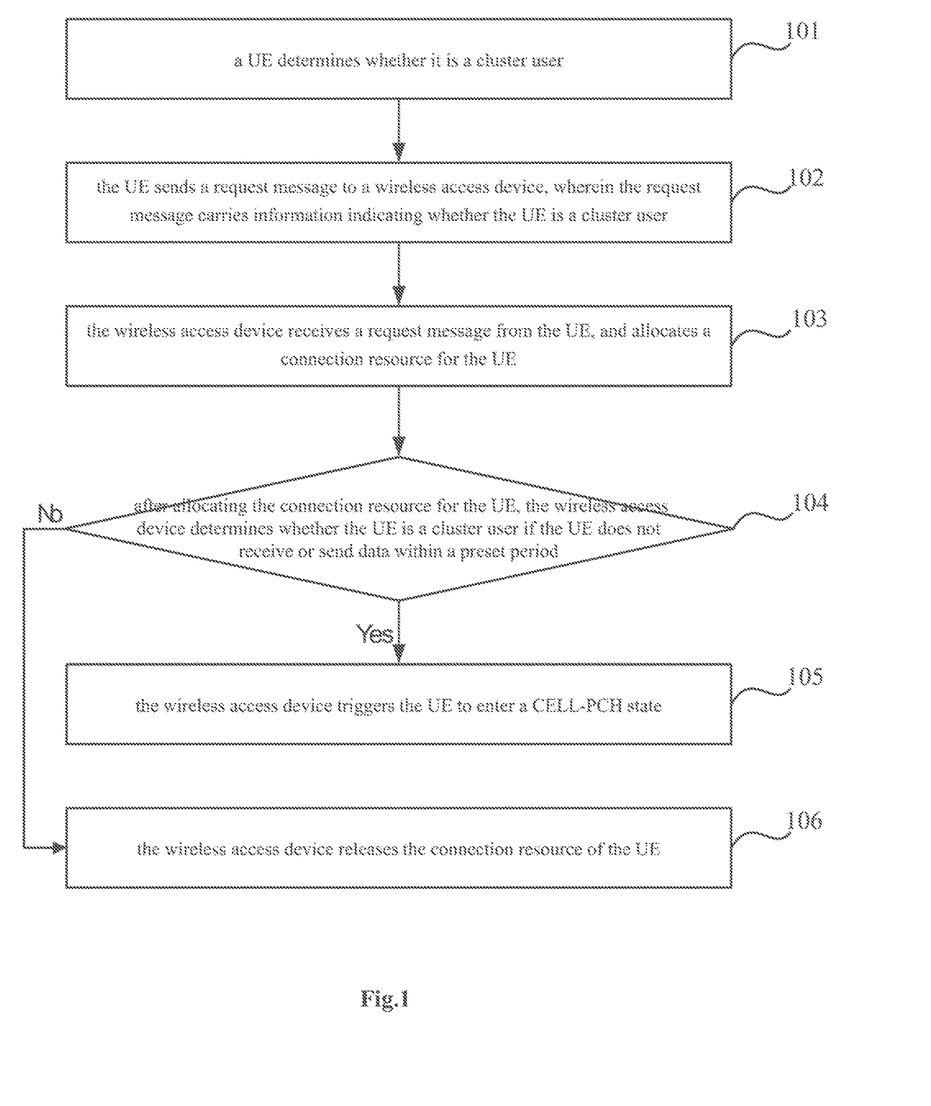
FIG. 1 is a flow chart of a trunking user based message transmission method provided by a first embodiment of the present application.

Compared with a public communication system, a trunking communication system has some special requirements (such as, a shorter call delay, multiple-receiving-per-sending, etc.), and adaptive modification may be made to the communication system, directing to features of the trunking communication system; the precondition of realizing the above process is in that a network side device (for example, a wireless access device) can identify whether a UE is a trunking user. Directing to the problem in the prior art that whether the UE is a trunking user can not be learned, the embodiments of the present application provide a trunking user based message transmission method so as to identify whether the UE is a trunking user, then wireless resources are allocated and a user management policy is scheduled based on the trunking identity of the UE; as shown in FIG. 1, the method may comprise the following steps:

Step 101, a UE determines whether it is a trunking user.

Step 102, the UE sends a request message to a wireless access device, wherein the request message carries information indicating whether the UE is a trunking user.

In the embodiment of the present application, the request message may comprise but not be limited to: a RRC connection establishment request message and a cell updating request message.

Specifically, during a RRC connection process, an RRC connection establishment request message sent from the UE to the wireless access device may carry information such as an establishment reason. The information such as the establishment reason may indicate a service type established by the UE (information such as calling party or called party, a voice service, a data service, a short message, registration and power off) to the wireless access device, such that the wireless access device may allocate appropriate wireless resources for the UE according to the establishment reason. On the basis of the above, in the embodiments of the present application, the RRC connection establishment request message sent from the UE to the wireless access device may also carry the information indicating whether the UE itself is a trunking user.

After the UE establishes the RRC connection, cell updating may occur due to a factor such as a change in wireless environment (for example, a wireless link failure, or a cell reselection). During the cell updating, a cell updating request message sent from the UE to the wireless access device may carry information such as a cell updating reason. The wireless access device reallocates appropriate wireless resources for the UE according to the information such as the cell updating reason. On the basis of the above, in the embodiments of the present application, the cell updating request message sent from the UE to the wireless access device may also carry information indicating whether the UE itself is a trunking user.

In the embodiments of the present application, the information indicating whether the UE is a trunking user may be embodied as an identifier.

Specifically, when the information of the trunking user is a first identifier (for example, 0), it is indicated that the UE is a trunking user; and when the information of the trunking user is a second identifier (for example, 1), it is indicated that the UE is not a trunking user.

Step 103, the wireless access device receives a request message from the UE, and allocates a connection resource for the UE, wherein, following the receipt of the RRC connection request message or the cell updating request message from the UE, the wireless access device needs to allocate the connection resource for the UE.

It should be noted that, the wireless access device and the UE may also perform related steps of a RRC connection process after receiving the RRC connection establishment request message from the UE, the description of which will be omitted in the embodiments of the present application; and the wireless access device and the UE may also perform related steps of a cell updating process after receiving the cell updating request message from the UE, the description of which will be omitted in the embodiments of the present application.

Step 104, after allocating the connection resource for the UE, the wireless access device determines whether the UE is a trunking user if the UE does not receive or send data within a preset period; when the UE is a trunking user, perform step 105; when the UE is not a trunking user, perform step 106.

Specifically, since the request message carries the information indicating whether the UE is a trunking user, when the information of the trunking user is a first identifier, the wireless access device may determine that the UE is a trunking user, then perform step 105; when the information of the trunking user is a second identifier, the wireless access device may determine that the UE is not a trunking user, then perform step 106.

In the embodiments of the present application, after allocating the connection resource for the UE, the wireless access device may monitor information such as signaling and data stream of the UE in real time. When both signaling and data stream of the UE are 0 within a preset period (which can be selected experientially), it is indicated that the UE does not receive or send data within the preset period.

Step 105, the wireless access device triggers the UE to enter a CELL-PCH (CELL-Paging Channel) state.

It should be noted that the UE may be kept on line continuously when the UE is in the CELL-PCH state. This means, it is possible for the UE to quickly establish a wireless connection and recover data communication when the UE transmits data again.

Specifically, the basic features of the CELL-PCH state are as follows: since there is no dedicated physical channel connection between the UE and the network side, in this state, for the purpose of saving power consumption, the UE may use a DRX (Discontinuous Reception) mode to monitor a PCH (Paging Channel) indicated by a PICH (Paging Indicator Channel); the network side may learn a cell where the UE is currently located according to the last cell updating process executed by the UE under the CELL_FACH state; if the UE needs to send an uplink data (responding to a paging or initiating a calling), the CELL-PCH state is first transferred to a CELL-EACH state.

Step 106, the wireless access device releases the connection resource of the UE.

It should be noted that, following the release of the connection resource of the UE, the UE is required to reestablish a RRC connection when it transmits data again.

In summary, in the embodiments of the present application, the wireless access device can identify the trunking identity of the UE (that is, learn whether the UE is a trunking user) by the RRC connection establishment request message or the cell updating request message, so as to allocate wireless resources and schedule a user management policy according to the trunking identity of the UE.

Figure 2:
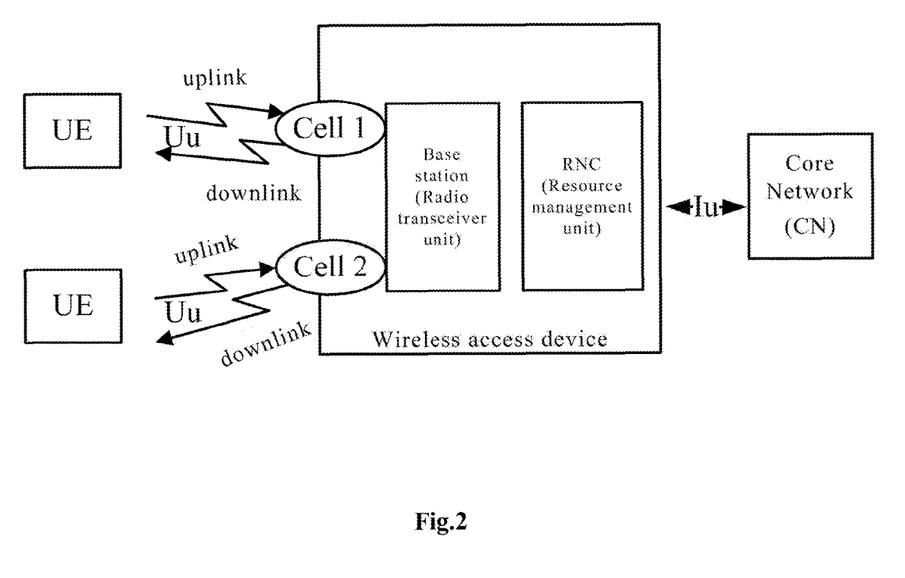
FIG. 2 is a schematic view of a circumstance according to the embodiment of the present application.

Hereafter, the embodiment of the present application will be further described in connection with the circumstance as shown in FIG. 2.

As shown in FIG. 2, the wireless access device consists of a base station and a RNC (Radio Network Controller), wherein the base station is a radio transceiver unit of the wireless access device, and the RNC is a resource management unit of the wireless access device; the wireless access device can control a plurality of cells, and the UE may establish a connection with the network side through the radio resources in the cell. In the wireless access device, the resource management unit may be configured to control the radio resources in the cell, including allocating resources for the UE, informing the UE to release the connection by an air interface message if the UE is rejected, etc.; and the radio transceiver unit is configured to receive data of the resource management unit and forward it to the UE after processing the data, meanwhile to receive data from the UE and forward it to the resource management unit after processing the data. In addition, the resource management unit may also receive data from a CN (Core Network) by an Iu interface and send data of the UE to the CN.

Second Embodiment

Figure 3:
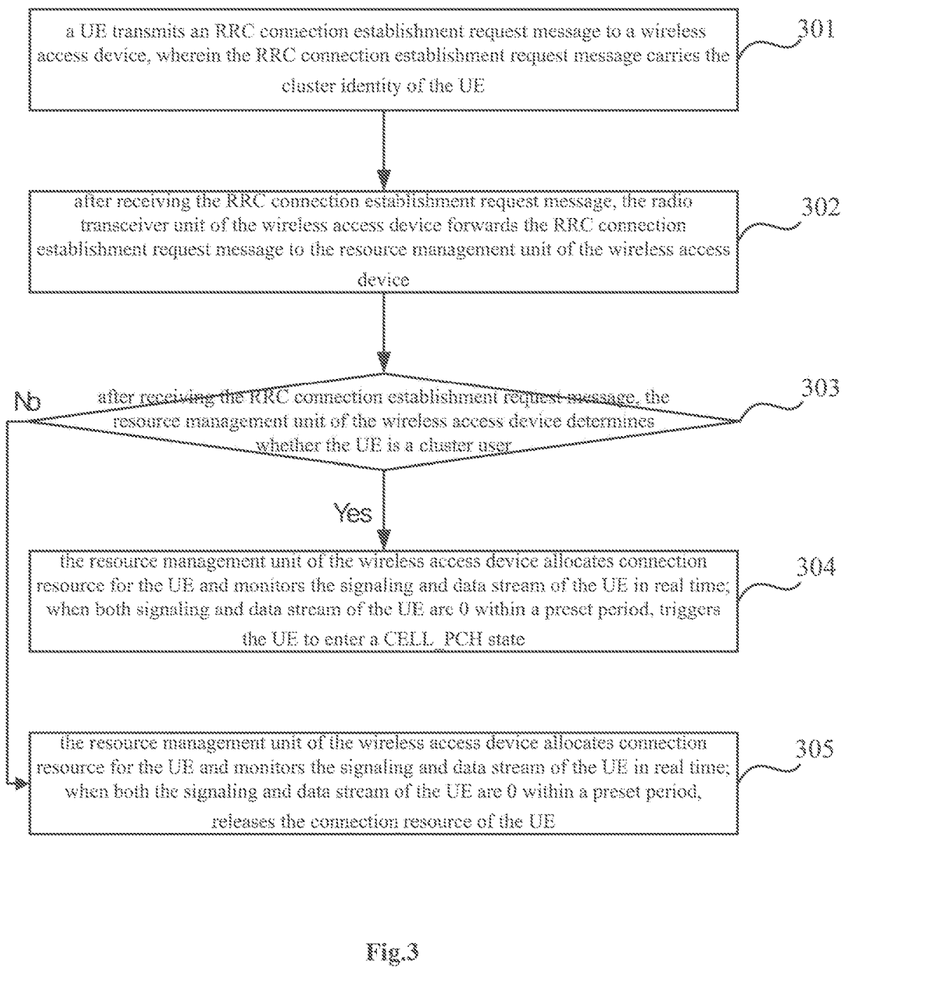
FIG. 3 is a flow chart of a trunking user based message transmission method provided by a second embodiment of the present application.

Based on the above circumstance and taking a RRC connection process as an example, the second embodiment of the present application provides a trunking user based message transmission method. As shown in FIG. 3, the method may comprise the following steps:

Step 301, a UE transmits an RRC connection establishment request message to a wireless access device, wherein the RRC connection establishment request message carries the trunking identity of the UE (which is used to identify whether the UE is a trunking user).

Step 302, after receiving the RRC connection establishment request message, the radio transceiver unit of the wireless access device forwards the RRC connection establishment request message to the resource management unit of the wireless access device.

Step 303, after receiving the RRC connection establishment request message, the resource management unit of the wireless access device determines whether the UE is a trunking user. If the UE is a trunking user, perform step 304; if the UE is not a trunking user, perform step 305.

It should be noted that after receiving the RRC connection establishment request message from the UE, the wireless access device (the resource management unit and the radio transceiver unit) and the UE may also perform related steps of a RRC connection process, the description of which will be omitted in the embodiments of the present application.

Step 304, the resource management unit of the wireless access device allocates a connection resource for the UE and monitors the signaling and data stream of the UE in real time; when both signaling and data stream of the UE are 0 within a preset period, triggers the UE to enter a CELL_PCH state, such that the UE is kept on line continuously; and when the UE transmits data again, it is possible for the UE to quickly establish a wireless connection and recover data communication.

Step 305, the resource management unit of the wireless access device allocates a connection resource for the UE and monitors the signaling and data stream of the UE in real time; when both signaling and data stream of the UE are 0 within a preset period, releases the connection resource of the UE; and when the UE transmits data again, the UE is required to reestablish a RRC connection.

In summary, in the embodiments of the present application, the wireless access device can identify the trunking identity of the UE (that is, learn whether the UE is a trunking user) by the RRC connection establishment request message, so as to allocate wireless resources and schedule a user management policy according to the trunking identity of the UE.

Third Embodiment

Figure 4:
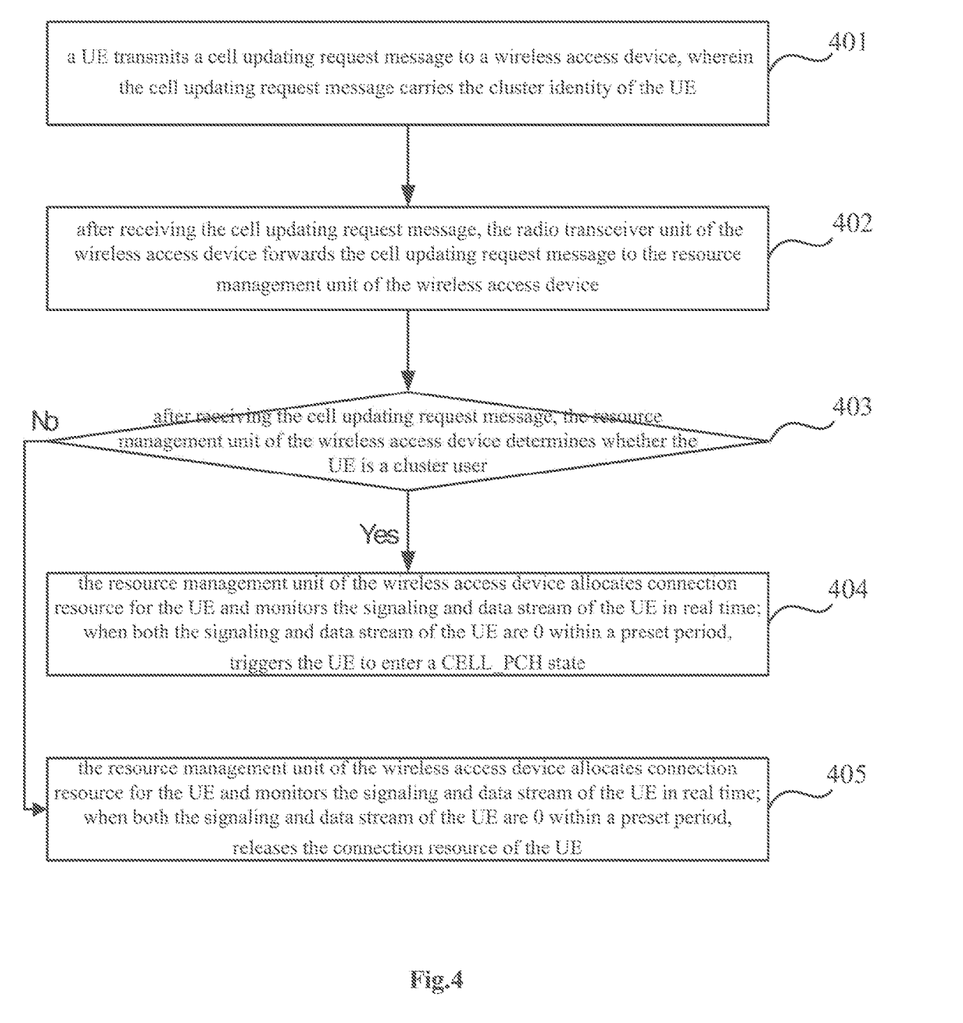
FIG. 4 is a flow chart of a trunking user based message transmission method provided by a third embodiment of the present application.

Based on the above circumstance and taking a cell updating process as an example, the third embodiment of the present application provides a trunking user based message transmission method. As shown in FIG. 4, the method may comprise the following steps:

Step 401, a UE transmits a cell updating request message to a wireless access device, wherein the cell updating request message carries the trunking identity of the UE (which is used to identify whether the UE is a trunking user).

Specifically, the UE may initiate a cell updating process due to a factor such as wireless environment, that is, the UE sends the cell updating request message to the wireless access device.

Step 402, after receiving the cell updating request message, the radio transceiver unit of the wireless access device forwards the cell updating request message to the resource management unit of the wireless access device.

Step 403, after receiving the cell updating request message, the resource management unit of the wireless access device determines whether the UE is a trunking user. If the UE is a trunking user, perform step 404; and if the UE is not a trunking user, perform 405.

It should be noted that after receiving the cell updating request message from the UE, the wireless access device (the resource management unit and the radio transceiver unit) and the UE may also perform related steps of the cell updating process, the description of which will be omitted in the embodiments of the present application.

Step 404, the resource management unit of the wireless access device allocates a connection resource for the UE and monitors the signaling and data stream of the UE in real time; when both the signaling and data stream of the UE are 0 within a preset period, triggers the UE to enter a CELL_PCH state, such that the UE is kept on line continuously, and when the UE transmits data again, it is possible for the UE to quickly establish wireless connection and recover data communication.

Step 405, the resource management unit of the wireless access device allocates connection resource for the UE and monitors the signaling and data stream of the UE in real time; when both the signaling and data stream of the UE are 0 within a preset period, releases the connection resource of the UE; and when the UE transmits data again, the UE is required to reestablish a RRC connection.

In summary, in the embodiments of the present application, the wireless access device can identify the trunking identity of the UE (that is, learn whether the UE is a trunking user) by the cell updating request message, so as to allocate wireless resources and schedule a user management policy according to the trunking identity of the UE.

Fourth Embodiment

Figure 5:
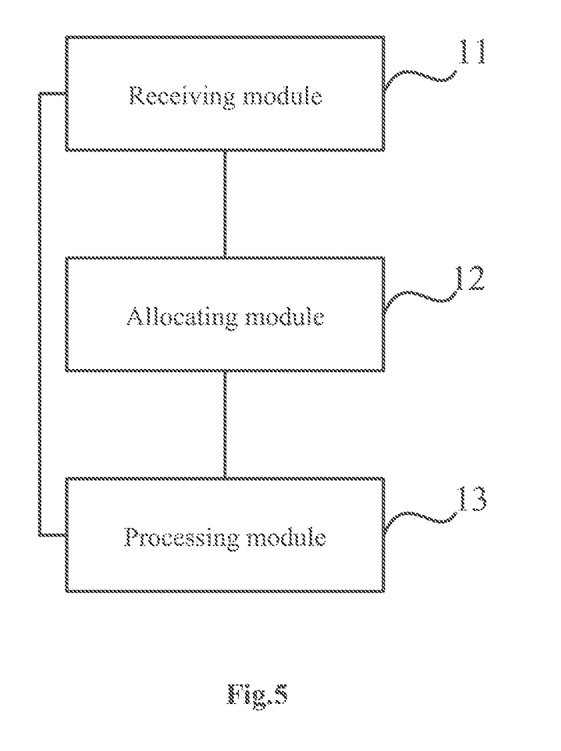
FIG. 5 is a block diagram of a wireless access device provided by a fourth embodiment of the invention.

Based on the same inventive concept as the above method, the fourth embodiment of the present application also provides a wireless access device. As shown in FIG. 5, the wireless access device may comprise:

a receiving module 11, configured to receive a request message from a user equipment, wherein the request message carries information indicating whether the user equipment is a trunking user; an allocating module 12, configured to allocate a connection resource for the user equipment; and a processing module 13, configured to, when the user equipment is a trunking user, and if the user equipment does not receive or send data within a preset period, trigger the user equipment to enter a CELL-PCH state; when the user equipment is not a trunking user, and if the user equipment does not receive or send data within a preset period, release the connection resource of the user equipment.

Preferably, the processing module 13 may also be configured to, when the information of the trunking user is a first identifier, determine that the UE is a trunking user; and when the information of the trunking user is a second identifier, determine that the UE is not a trunking user.

Preferably, in the embodiments of the present application, the request message may comprise: a RRC connection establishment request message and a cell updating request message.

In summary, in the embodiments of the present application, the wireless access device can identify the trunking identity of the UE (that is, learn whether the UE is a trunking user) by the RRC connection establishment request message or the cell updating request message, so as to allocate wireless resources and schedule a user management policy according to the trunking identity of the UE.

Herein, various modules in the device according to the present application may be integrally formed or separately deployed. Above discussed modules can be combined into a single module or further divided into a plurality of sub-modules.

Fifth Embodiment

Figure 6:
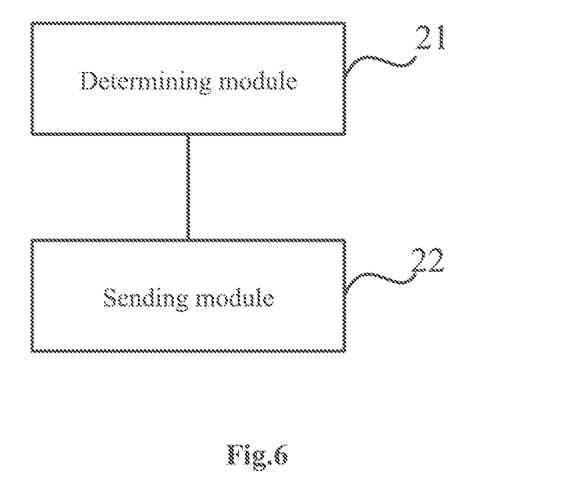
FIG. 6 is a block diagram of a user equipment provided by a fifth embodiment of the invention.

Based on the same inventive concept as the above method, the fifth embodiment of the present application provides a UE (user equipment). As shown in FIG. 6, the user equipment may comprise:

a determining module 21, configured to determine whether the user equipment is a trunking user; and a sending module 22, configured to send a request message to a wireless access device, wherein the request message carries information indicating whether the user equipment is a trunking user.

Preferably, in the embodiments of the present application, when the information of the trunking user is a first identifier, it is indicated that the UE is a trunking user; when the information of the trunking user is a second identifier, it is indicated that the UE is not a trunking user.

Preferably, in the embodiments of the present application, the request message may comprise: a RRC connection establishment request message and a cell updating request message.

In summary, in the embodiments of the present application, the wireless access device can identify the trunking identity of the UE (that is, learn whether the UE is a trunking user) by the RRC connection establishment request message or the cell updating request message, so as to allocate wireless resources and schedule a user management policy according to the trunking identity of the UE.

Herein, various modules in the device according to the present application may be integrally formed or separately deployed. Above discussed modules can be combined into a single module or further divided into a plurality of sub-modules.

Through the above description of the embodiments, it should be clearly appreciated by the person skilled in the art that the present application may be implemented by means of software in connection with the required universal hardware platform, and of course, can also be implemented by hardware, but in many cases the former is a more preferred implementation. Based on this understanding, the essential part or the part contributing to the prior art of the technical solution of the invention may be embodied as a form of software product. The computer software product may be stored in the storage medium, and comprise a plurality of instructions which could used to execute the method as described in various embodiments of the invention by a computer system (that could be a personal computer, a server or network device).

It should be appreciated by the person skilled in the art that the accompanying drawings are only schematic views of the preferred embodiments, and the modules or processes in the accompanying drawings are not necessarily required to implement the invention.

It should be appreciated by the person skilled in the art that the modules of the device in the embodiment may be disposed in the device of the embodiment as described herein, or may be changed accordingly to be positioned in one or more different devices from that in the embodiment. The modules in above embodiment can be combined in a single module or can be further divided into multiple sub-modules.

The sequence numbers of the embodiments of the invention are only for the descriptive purpose rather than represent the relative merits of the embodiments.

Disclosed above are merely specific embodiments of the invention. However, the present invention is not limited thereto. Any modifications which could be contemplated by the person skilled in the art will be fallen into protection scope of the present invention.

The invention claimed is:

1. A trunking user based message transmission method, comprising:
receiving a request message from a user equipment by a wireless access device, allocating a connection resource for the user equipment and monitoring signaling and data stream of the user equipment by the wireless access device, wherein the request message includes a Radio Resource Control (RRC) connection establishment request message or a cell updating request message, the Radio Resource Control (RRC) connection establishment request message carries information indicating whether the user equipment is a trunking user, the cell updating request message carries information indicating whether the user equipment is a trunking user; wherein the information indicating whether the user equipment is a trunking user is embodied as an identifier represented by a bit; when the information is a first identifier, the user equipment is the trunking user, and if there are no signaling and data stream associated with the user equipment within a preset period, triggering the user equipment to enter a CELL_Paging Channel (CELL_PCH) state by the wireless access device; wherein when the user equipment is in the CELL-PCH state, the user equipment is kept connected to a server continuously; when the user equipment transmits data again, the user equipment establishes a wireless connection and recover data communication immediately; and
when the information is a second identifier, the user equipment is not the trunking user, and if there are no signaling and data stream associated with the user equipment within the preset period, releasing the connection resource of the user equipment by the wireless access device.

2. A trunking user based message transmission method, comprising:
determining whether a user equipment is a trunking user, by the user equipment; and
sending a request message to a wireless access device by the user equipment, wherein the request message includes a Radio Resource Control (RRC) connection establishment request message or a cell updating request message, the Radio Resource Control (RRC) connection establishment request message carries information indicating whether the user equipment is the trunking user, the cell updating request message carries information indicating whether the user equipment is a trunking user; wherein the information indicating whether the user equipment is a trunking user is embodied as an identifier represented by a bit;

wherein when the information is a first identifier, the user equipment is the trunking user, and if there are no signaling and data stream associated with the user equipment within a preset period, the user equipment enters a CELL_Paging Channel (CELL_PCH) state; wherein when the user equipment is in the CELL-PCH state, the user equipment is kept connected to a server continuously; when the user equipment transmits data again, the user equipment establishes a wireless connection and recover data communication immediately;

when the information is a second identifier, the user equipment is not the trunking user, and if there are no signaling and data stream associated with the user equipment within the preset period, the connection resource of the user equipment is released.

3. A non-transitory computer readable medium storing a program causing a computer to execute trunking user based message transmission, comprising:
   a receiving module, configured to receive a request message from a user equipment, wherein the request message includes a Radio Resource Control (RRC) connection establishment request message or a cell updating request message, the Radio Resource Control (RRC) connection establishment request message carries information indicating whether the user equipment is a trunking user, the cell updating request message carries information indicating whether the user equipment is a trunking user; wherein the information indicating whether the user equipment is a trunking user is embodied as an identifier represented by a bit;
   an allocating module, configured to allocate a connection resource for the user equipment; and
   a processing module, configured to, when the information is a first identifier, the user equipment is the trunking user, and if there are no signaling and data stream associated with the user equipment within a preset period, trigger the user equipment to enter a CELL_Paging Channel (CELL_PCH) state, wherein when the user equipment is in the CELL-PCH state, the user equipment is kept connected to a server continuously; when the user equipment transmits data again, the user equipment establishes a wireless connection and recover data communication immediately, and when the information is a second identifier, the user equipment is not the trunking user, and if there are no signaling and data stream associated with the user equipment within the preset period, release the connection resource of the user equipment.

4. A user equipment, comprising:
   a determining module, configured to determine whether the user equipment is a trunking user; and
   a sending module, configured to send a request message to a wireless access device, wherein the request message includes a Radio Resource Control (RRC) connection establishment request message or a cell updating request message, the Radio Resource Control (RRC) connection establishment request message carries information indicating whether the user equipment is a trunking user, the cell updating request message carries information indicating whether the user equipment is a trunking user; wherein the information indicating whether the user equipment is a trunking user is embodied as an identifier represented by a bit;
wherein when the information is a first identifier, the user equipment is the trunking user, and if there are no signaling and data stream associated with the user equipment within a preset period, the user equipment enters a CELL_Paging Channel (CELL_PC) state, wherein when the user equipment is in the CELL-PCH state, the user equipment is kept connected to server continuously; when the user equipment transmits data again, the user equipment establishes a wireless connection and recover data communication immediately, and when the information is a second identifier, the user equipment is not the trunking user, and if there are no signaling and data stream associated with the user equipment within the preset period, the connection resource of the user equipment is released.

* * * * *